United States Patent
Banerjee et al.

[11] Patent Number: 5,672,438
[45] Date of Patent: Sep. 30, 1997

[54] MEMBRANE AND ELECTRODE ASSEMBLY EMPLOYING EXCLUSION MEMBRANE FOR DIRECT METHANOL FUEL CELL

[75] Inventors: Shoibal Banerjee, Newark, Del.; Cecelia C. Cropley, Acton, Mass.; John A. Kosek, Danvers, Mass.; Anthony B. La Conti, Lynnfield, Mass.

[73] Assignee: E. I. Du Pont de Nemours and Company, Wilmington, Del.

[21] Appl. No.: 719,745

[22] Filed: Sep. 25, 1996

Related U.S. Application Data

[60] Provisional application No. 60/005,051, Oct. 10, 1995.
[51] Int. Cl.$^6$ .................... H01M 8/10
[52] U.S. Cl. .................... 429/33; 429/42
[58] Field of Search ............ 429/30, 33, 40, 429/41, 42, 191, 192; 252/62.2; 204/296

[56] References Cited

U.S. PATENT DOCUMENTS

| | | | |
|---|---|---|---|
| 4,224,121 | 9/1980 | Dempsey et al. | 204/98 |
| 4,358,545 | 11/1982 | Exxel et al. | 521/27 |
| 4,390,603 | 6/1983 | Kawana et al. | 429/30 |
| 5,272,017 | 12/1993 | Swathirajan et al. | 429/33 |
| 5,399,184 | 3/1995 | Harada | 29/623.4 |
| 5,403,675 | 4/1995 | Ogata et al. | 429/33 |

FOREIGN PATENT DOCUMENTS

| | | |
|---|---|---|
| 0 498 076 A1 | 8/1992 | European Pat. Off. . |
| 2 478 130 A | 9/1981 | France . |
| 63-076265A | 8/1988 | Japan . |
| 63-076269A | 8/1988 | Japan . |
| WO94/03503A | 2/1994 | WIPO . |
| WO96/12317 | 4/1996 | WIPO . |
| WO96/29752A | 9/1996 | WIPO . |

*Primary Examiner*—Anthony Skapars

[57] ABSTRACT

Cation exchange membranes incorporating a thin layer of polymer having having a high ratio of backbone carbon atoms to cation exchange groups provide improved performance in direct methanol fuel cells.

16 Claims, 3 Drawing Sheets

MEMBRANE AND ELECTRODE ASSEMBLY EMPLOYING EXCLUSION MEMBRANE FOR DIRECT METHANOL FUEL CELL

GOVERNMENT RIGHTS

The Government has rights in this invention pursuant to Advanced Research Project Agency (ARPA) Contract No. NAS7-1260.

RELATED APPLICATIONS

The present application claims benefit of U.S. Provisional Application No. 60/005,051, filed Oct. 10, 1995.

FIELD OF THE INVENTION

This invention is in the field of membrane and electrode assemblies (MEA) for fuel cells.

BACKGROUND OF THE INVENTION

A direct methanol fuel cell (DMFC) which utilizes a proton-exchange membrane (PEM) as the electrolyte, has the capability to replace batteries in small, portable applications. Analyses indicate that the performance level of this fuel cell at the present time is almost high enough that such a small version of a direct methanol proton-exchange membrane fuel system (DMPEMFC) could be competitive with primary lithium batteries in terms of size and weight. Such a "fuel cell battery" would have several advantages over lithium batteries. These include (a) potentially much lighter weight and greater compactness, especially for long-duration operating times, (b) simpler "recharge" involving only the addition of fuel rather than battery replacement and (c) elimination of disposal issues (quite extensive for lithium batteries) and the need for storage of batteries.

The methanol fuel cell is also a potentially attractive power source for vehicles and other low to medium power applications such as uninterruptible power supplies and lawn mowers, in the military as well as the commercial sectors. Benefits to be derived from use of direct methanol fuel cells as power sources include dramatic reductions in emmissions of air pollutants, reduction in the nation's dependence on imported petroleum since methanol can be made from indigenous fuels such as coal and natural gas and also from renewable sources such as wood and biomass, and an overall increase in vehicle energy efficiency. Use of liquid methanol fuel avoids the difficulties and hazards associated with the handling of gaseous reactants such as hydrogen. Vehicles powered by DMFCs have the potential for a very large market in California, the New England States, and other states in the Northeast that have mandated the introduction of zero-emission vehicles by the end of the decade.

Methanol fuel cell systems currently under development use low-temperature steam reformers in conjunction with fuel cell stacks to generate power from methanol in indirect systems. By "indirect" it is meant that methanol fuel is processed (by a reformer) before it is introduced into the fuel cell stack. However, the system can be vastly simplified, and the overall system thermal efficiency can be improved if direct anodic oxidation of methanol is achieved at low polarization. A direct methanol fuel cell will also be preferred for vehicular applications because its weight, volume, start-up and load-following characteristics should be more attractive than the more complex indirect systems.

Several different types of fuel cells have been evaluated for direct methanol operation, including molten carbonate fuel cells (Wheeler & Lesieur, *Procedings of the Workshop on Direct Methanol-Air Fuel Cells*, Vol. 92–14, The Electrochemical Society, p. 193, 1992), aqueous carbonate fuel cells (Sarangapani et al., *Procedings of the Workshop on Direct Methanol-Air Fuel Cells*, Vol. 92–14, The Electrochemical Society, p. 161, 1992), sulfuric acid fuel cells (Yamaguchi, Automotive Engineering 91, 65, 1983; Shimizu et al., U.S. Pat. No. 4,562,123), and phosphoric acid fuel cells (Landsman & Luczak, ADA105947, Report to Fort Belvoir by United Technolgies, 1981). However, due to high projected power densities, low operating temperature and pressure, and the potential for system simplification, the fuel cell system receiving the most attention for transportation applications, using methanol as a fuel, is the proton-exchange membrane fuel cell (PEMFC). This fuel cell uses a hydrated sheet of perfluorinated ion-exchange membrane as a solid electrolyte in the fuel cell; catalytic electrodes are intimately bonded to each side of the membrane. Membranes of this type are sold commercially, for example, under the trademark Nafion® from E.I. du Pont de Nemours and Company.

The methanol feed to a PEMFC may be either the vapor or liquid phase. From a systems standpoint, operation on liquid methanol appears to be more advantageous because of its simplicity (simple and efficient heat management) and inherent reliability (cell membrane flooded with water). Through the use of advanced anode catalysts and electrode structures, the highest DMFC performance using a liquid methanol feed reported to date was obtained, namely 575 and 510 mV terminal voltages at 100 and 200 $mA/cm^2$, respectively, at 60° C. Work at 80° C. has increased the performance to 640 and 570 mV at 100 and 200 $mA/cm^3$, respectively, as shown in FIG. 1 (Kosek et al., "A Direct Methanol Oxidation Fuel Cell", $28^{th}$ Intersociety Energy Conversion Conference, 1993).

One drawback to direct methanol PEMFC (DMPEMFC) is that the currently available PEM electrolytes do not totally exclude methanol. Instead, methanol permeates from the anode chamber of the PEMFC across the membrane, absorbs on the cathode catalyst, and reacts with reactant air ($O_2$), resulting in a parasitic loss of methanol fuel and reduced fuel cell voltage. Performance losses of 40–70 mV at a given current density have been observed at the cathode of PEMFCs with a direct methanol feed (Potje-Kamloth et al., Abstract No. 105, *Extended Abstracts*, Vol. 92–2, Fall Meeting of the Electrochemical Society, 1992). Most recently, Küver et al. in J. Power Sources 52, 77 (1994) have observed a loss of at least 100 mV for the oxygen electrode when operated in a gas-feed DMFC. This translates into an approximately 10% decrease in PEMFC air ($O_2$) cathode performance output as compared to a cell operating without direct methanol feed. To compensate for inefficiencies due to methanol crossover, DMPEMFCs must be oversized, resulting in a larger, heavier and more expensive fuel cell. To be competitive, these parameters must be minimized.

Kwana (U.S. Pat. No. 4,390,603) and Sterzel (U.S. Pat. Nos. 4,774,163 and 4,828,941) teach the use of ionomers as separators; however, the membrane films they describe have relatively high methanol permeabilities.

SUMMARY OF THE INVENTION

In accordance with the invention, provided is a membrane and electrode assembly including a cation exchange membrane with an electrode formed on at least one of its surfaces. The membrane is comprised of a polymer having a polymer backbone and cation exchange groups carried on recurring side chains attached to the polymer backbone, the ratio of carbon atoms in the polymer backbone to cation exchange groups being at least about 23:1. These membranes have low methanol permeability, and increase fuel cell power output and system efficiency.

In a preferred form of the invention, the cation exchange membrane is a laminate comprising a first layer of polymer having a polymer backbone and cation exchange groups carried on recurring side chains attached to the polymer backbone, the ratio of carbon atoms in the polymer backbone to cation exchange groups being at least about 23:1, and a second layer of at least one additional cation exchange polymer having a polymer backbone and cation exchange groups carried on recurring side chains attached to the polymer backbone, the ratio of carbon atoms in the polymer backbone to cation exchange groups being less than the ratio in the first layer.

The invention further provides a fuel cell comprising an anode compartment, a cathode compartment and a cation exchange membrane serving as a separator and electrolyte between the anode and cathode compartments, the cation exchange membrane comprising polymer having cation exchange groups with an electrode formed on at least one of its surfaces, the polymer having a polymer backbone and cation exchange groups carried on recurring side chains attached to the polymer backbone, the ratio of carbon atoms in the polymer backbone to cation exchange groups being at least about 23:1.

DETAILED DESCRIPTION

It has been discovered that DMFC efficiency is significantly improved by using an ion exchange membrane comprising polymer having a high ratio of carbon atoms in the polymer backbone to cation exchange groups, even though ionic conductivity decreases as this ratio increases. The ratio of carbon atoms in the polymer backbone to cation exchange groups is sometimes referred to hereinafter as "IXR". The increase in efficiency is a consequence of the surprising finding that, while methanol fuel crossover decreases with increasing IXR, crossover is essentially independent of thickness so that a thin membrane having high IXR can be used to achieve reduced methanol crossover without severe penalty to ionic conduction. To restore mechanical integrity, the thin high-IXR membrane can be laminated to a low-IXR membrane having higher ionic conductivity. When used in a laminate, the thickness of the high-IXR component is no more than half of total membrane thickness. An IXR of at least about 23:1 is desired for the high-IXR membrane component, and IXR of no more than about 17:1 is desired for the low-IXR membrane component.

Figure 1:
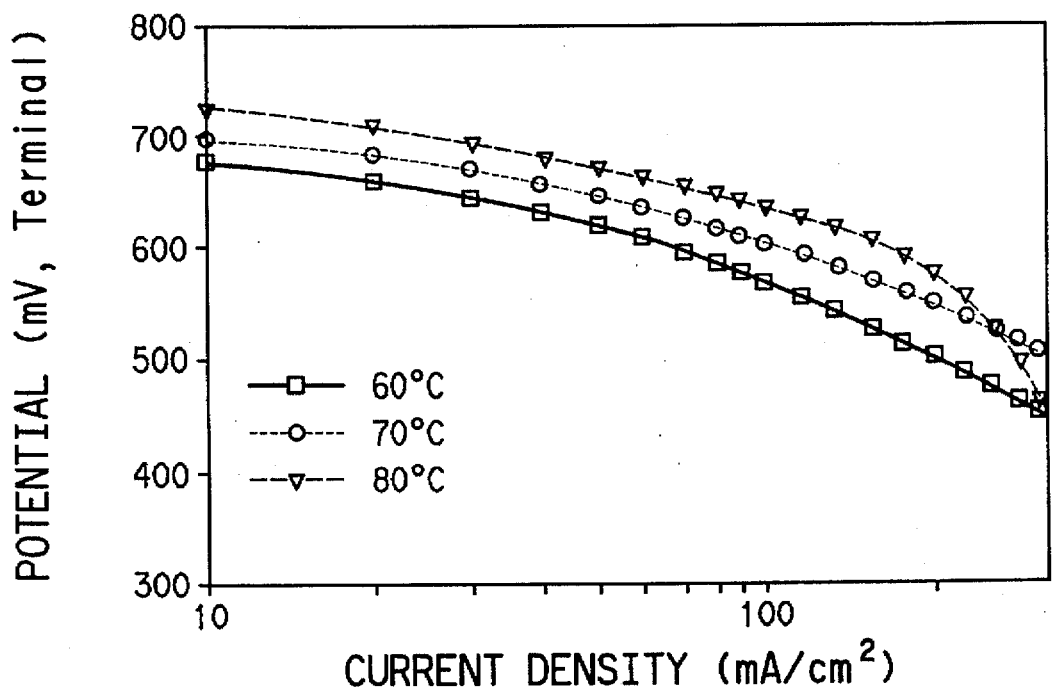
FIG. 1 shows the effect of temperature on direct methanol PEMFC performance.
Figure 2:
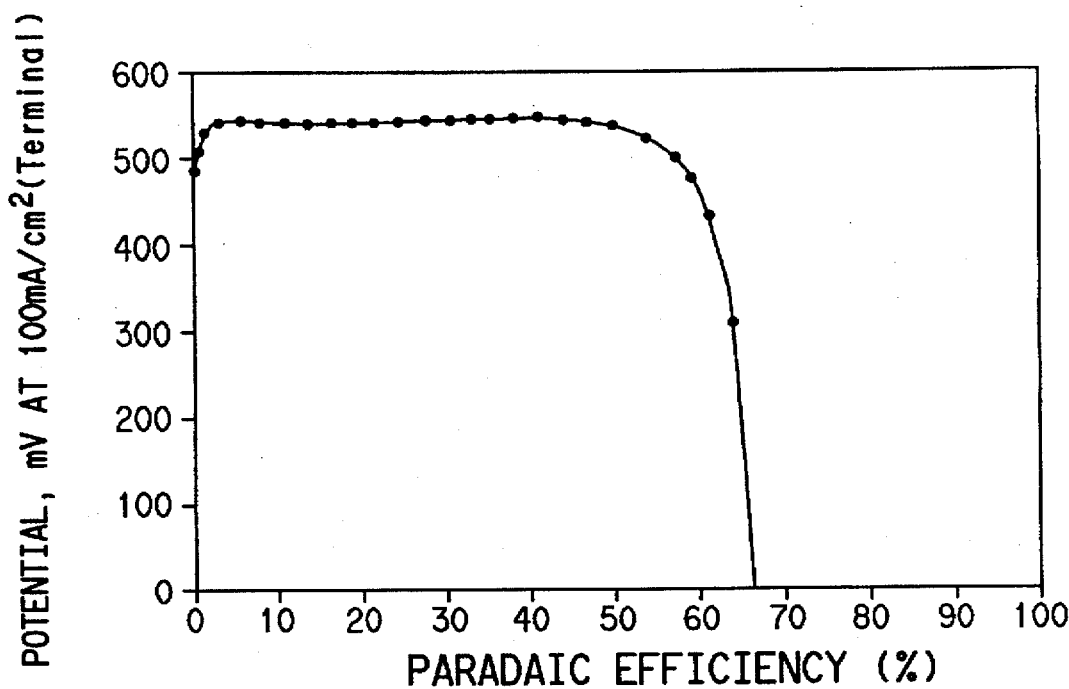
FIG. 2 shows the performance characteristics of a baseline MEA containing Membrane C during methanol utilization studies. See Table 1 and Example 1.

PEMFC system efficiency will be significantly improved by decreasing methanol permeability or crossover through the PEMFC ionomer membrane. The Faradaic efficiency for utilization of methanol in an Giner, Inc., PEMFC operating on direct methanol is shown in FIG. 2 for Membrane C described in Table 1 below. Approximately 60–65% of the totally available methanol is electrochemically utilized. Most of the remaining methanol permeates through the PEM (Membrane C) from anode to cathode and is parasitically coverted to $CO_2$ at the cathode by the $O_2$ (air) reactant.

In a preferred form of the invention, the polymer comprises a polymer backbone and recurring side chains attached to the backbone with the side chains carrying the cation exchange groups. For example, copolymers of a first fluorinated vinyl monomer and a second fluorinated vinyl monomer having a side cation exchange group or a cation exchange group precursor can be used, e.g., sulfonyl fluoride groups (—$SO_2F$) which can be subsequently hydrolyzed to sulfonic acid groups. Possible first monomers include tetrafluoroethylene (TFE), hexafluoropropylene, vinyl fluoride, vinylidine fluoride, trifluorethylene, chlortrifluoroethylene, perfluoro (alkyl vinyl ether), and mixtures thereof. Possible second monomers include a variety of fluorinated vinyl ethers with cation exchange groups or precursor groups.

Preferably, the polymer in accordance with the invention has a polymer backbone which is highly fluorinated and the ion exchange groups are sulfonate groups. The term "sulfonate groups" is intended to refer either to sulfonic acid groups or alkali metal or ammonium salts of sulfonic acid groups. "Highly fluorinated" means that at least 90% of the total number of halogen and hydrogen atoms are fluorine atoms. Most preferably, the polymer backbone is perfluorinated. It is also preferable for the side chains to be highly fluorinated and, most preferably, the side chains are perfluorinated.

A class of preferred polymers for use in the present invention include a highly fluorinated, most preferably perfluorinated, carbon backbone and the side chain is represented by the formula —$(OCF_2CFR_f)_a$—$OCF_2CFR'_fSO_3X$, wherein $R_f$ and $R'_f$ are independently selected from F, Cl or a perfluorinated alkyl group having 1 to 10 carbon atoms, a=0, 1 or 2, and X is H, an alkali metal, or $NH_4$. The preferred polymers include, for example, polymers disclosed in U.S. Pat. Nos. 4,358,545 and 4,940,525. Most preferably, polymer comprises a perfluorocarbon backbone and said side chain is represented by the formula —O—$CF_2CF(CF_3)$—O—$CF_2CF_2SO_3X$, wherein X is H, an alkali metal, or $NH_4$. Polymers of this type are disclosed in U.S. Pat. No. 3,282,875

The equivalent weight of the cation exchange polymer can be varied as desired for the particular application. For the purposes of this application, equivalent weight is defined to be the weight of the polymer in sulfonic acid form required to neutralize one equivalent of NaOH. In the case where the polymer comprises a perfluorocarbon backbone and the side chain is the salt of —O—$CF_2$—$CF(CF_3)$—O—$CF_2$—$CF_2$—$SO_3X$, the equivalent weight preferably is at least 1500, most preferably 1500–1800. The equivalent weight of the polymers disclosed in U.S. Pat. Nos. 4,358,545 and 4,940,525 is preferably somewhat lower because of the molecular weight of the monomer unit containing a cation exchange group. Hence, it is convenient here to describe the cation exchange polymer in terms of the ratio of backbone carbon atoms to cation exchange groups. This ratio (IXR, ratio of polymer backbone carbon atoms to cation exchange groups carried on recurring side chains attached to said polymer backbone) is at least about 23:1, preferably 23:1 to 29:1. When the membrane is a laminate, which is preferred, comprising at least one additional cation exchange polymer having a lower IXR. The additional cation exchange polymer preferably has an IXR of no more than about 17:1, most preferably 9:1 to 17:1. When the membrane is a laminate, the chemical identities of the monomer units in the additional cation exchange polymer can independently be the same as or different from the identities of the analogous monomer units of the first cation exchange polymer.

In the manufacture of membranes using polymer which has a highly fluorinated polymer backbone and sulfonate ion exchange groups, membranes are typically formed from the polymer in its sulfonyl fluoride form since it is thermoplastic in this form and conventional techniques for making films from thermoplastic polymer can be used. Alternately, the polymer may be in another thermoplastic form such as by having —$SO_2X$ groups where X is $CH_3$, $CO_2$, or a quaternary amine. Solution film casting techniques using suitable solvents for the particular polymer can also be used if desired.

A film of the polymer in sulfonyl fluoride form can be converted to the sulfonate form (sometimes referred to as ionic form) by hydrolysis using methods known in the art. For example, the membrane may be hydrolyzed to convert it to the sodium sulfonate form by immersing it in 25% by weight NaOH for about 16 hr at a temperature of about 90° C. followed by rinsing the film twice in deionized 90° C. water using about 30 to about 60 minutes per rinse. Another possible method employs an aqueous solution of 6–20% of an alkali metal hydroxide and 5–40% polar organic solvent such as dimethyl sulfoxide with a contact time of at least 5 minutes at 50°–100° C. followed by rinsing for 10 minutes. After hydrolyzing, the membrane can be converted if desired to another ionic form by contacting the membrane in a bath containing a 1% salt solution containing the desired cation or, to the acid form, by contacting with an acid and rinsing. For fuel cell use, the membrane is usually in the sulfonic acid form.

In a preferred embodiment of this invention, the membrane is a laminated membrane of two polymers such as two highly fluorinated polymers having different ion exchange groups and/or different ion exchange capacities. Such membranes can be made by laminating two films or co-extruding a film with the two polymer layers. Alternatively, one or both of the laminate components can be cast from solution or dispersion. For example, the thinner high-IXR component can be cast from solution onto the thicker low-IXR component of the membrane laminate. In addition, the membrane may be made of a blend of two or more polymers such as two or more highly fluorinated polymers having different ion exchange groups and/or different ion exchange capacities.

When the membrane is a laminate, the preferred orientation of the laminate is to have the high-IXR component on the anode, i.e., the methanol, side.

The thickness of the membrane can be varied as desired for a particular electrochemical cell application. Typically, the thickness of the membrane is generally less than about 250 µm, preferably in the range of about 25 µm to about 150 µm. When the membrane is a laminate, the thickness of the high-IXR component is no more than 50% of total laminate thickness, preferably no more than 30% and most preferably no more than 20%. When the membrane is a monolithic high-IXR membrane, i.e., not a laminate, thickness is preferably no more than about 100 µm.

The membrane may optionally include a porous support for the purposes of improving mechanical properties, for decreasing cost and/or other reasons. The porous support of the membrane may be made from a wide range of components. The porous support of the present invention may be made from a hydrocarbon such as a polyolefin, e.g., polyethylene, polypropylene, polybutylene, copolymers of those materials, and the like. Perhalogenated polymers such as polychlorotrifluoroethylene may also be used. For resistance to thermal and chemical degradation, the support preferably is made of a highly fluorinated polymer, most preferably perfluorinated polymer.

For example, the polymer for the porous support can be a microporous film of polytetrafluoroethylene (PTFE) or a copolymer of tetrafluoroethylene with

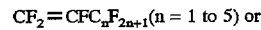

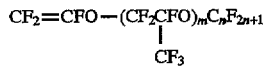

(m = 0 to 15, n = 1 to 15)

Microporous PTFE films and sheeting are known which are suitable for use as a support layer. For example, U.S. Pat. No. 3,664,915 discloses uniaxially stretched film having at least 40% voids. U.S. Pat. Nos. 3,953,566, 3,962,153 and 4,187,390 disclose porous PTFE films having at least 70% voids.

Alternatively, the porous support may be a fabric made from fibers of the polymers discussed above woven using various weaves such as the plain weave, basket weave, leno weave, or others.

A membrane can be made using the porous support by coating cation exchange polymer on the support so that the coating is on the outside surfaces as well as being distributed through the internal pores of the support. This may be accomplished by impregnating the porous support solution/dispersion with the cation exchange polymer or cation exchange polymer precursor using a solvent which is not harmful to the polymer of the support under the impregnation conditions and which can form a thin, even coating of the cation exchange polymer on the support. For example, for applying a coating of perfluorinated sulfonic acid polymer to a microporous PTFE support, a 1–10 weight percent solution/dispersion of the polymer in water mixed with sufficient amount of a polar organic solvent can be used. The support with the solution/dispersion is dried to form the membrane. If desired, thin films of the ion exchange polymer can be laminated to one or both sides of the impregnated porous support to prevent bulk flow through the membrane which can occur if large pores remain in the membrane after impregnation.

Figure 3:
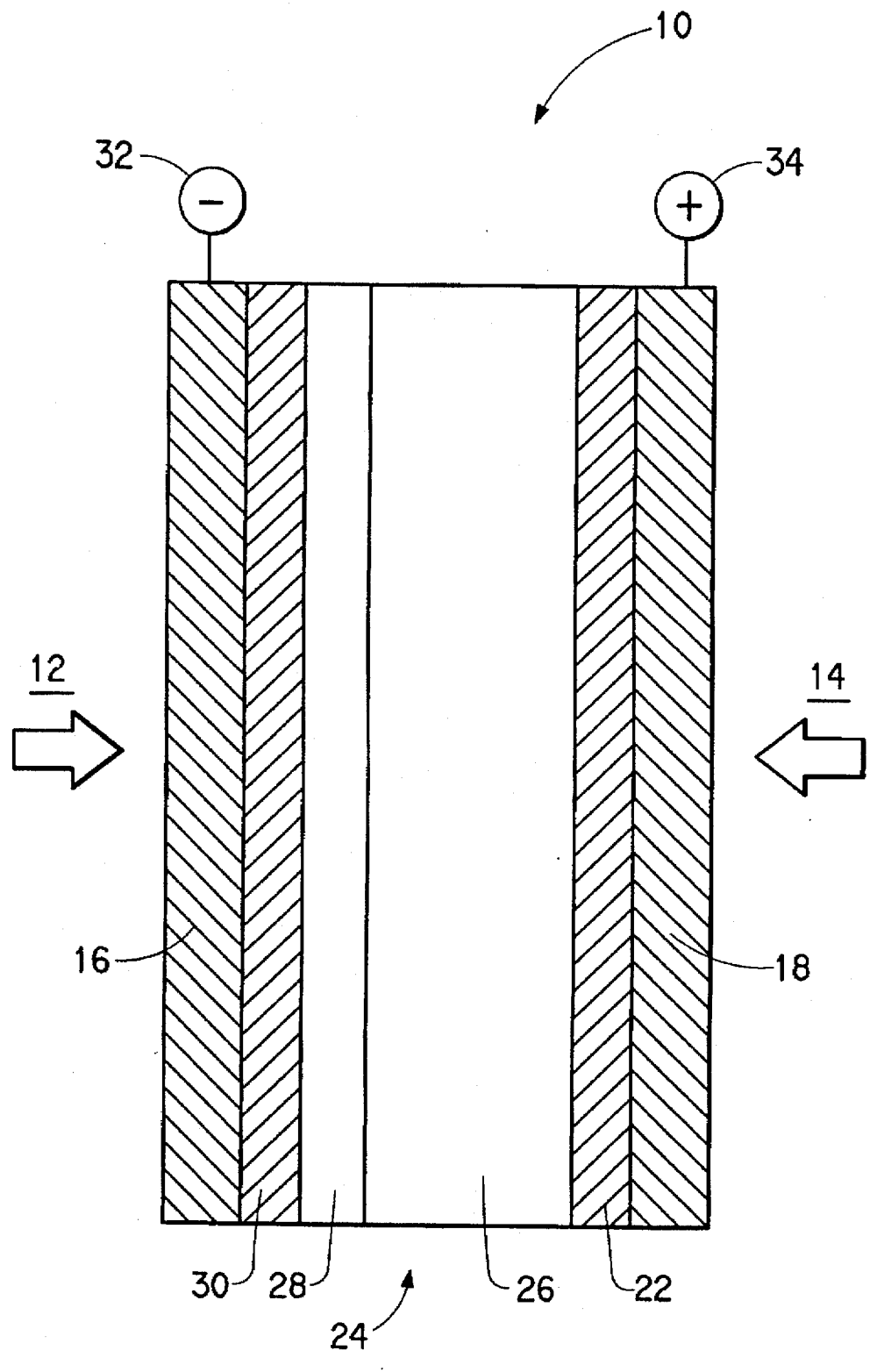
FIG. 3 is a schematic drawing which depicts the structure of a preferred membrane and electrode assembly (MEA) in accordance with the present invention.

With reference to FIG. 3, a membrane and electrode assembly (MEA) 10 in accordance with the invention is illustrated as used in a direct methanol fuel cell. The fuel cell utilizes a methanol fuel source indicated by arrow 12 (typically a methanol/water solution) supplied to an anode compartment (not shown) and an oxidizer source indicated by arrow 14 such as air or oxygen supplied to an a cathode compartment (not shown).

MEA 10 includes a cation exchange membrane 24 serves as an electrolyte (for proton transport) and separates the anode compartment from the cathode compartment. A porous anode current collector 16 and a porous cathode current collector 18 are provided to conduct current from the cell. Cathode current collector 18 is electrically connected to positive terminal 34 and anode current collector 16 is electrically connected to negative terminal 32. MEA 10 also includes a catalyst layer 22 which functions as the cathode and is in contact with and between the cathode-facing surface of membrane 26 and the cathode current collector 18. A catalyst layer 30 which functions as the anode is disposed between and is in contact with the anode-facing surface of the membrane 26 and anode current collector 16.

The membrane 24 depicted is a preferred composite membrane having a low-IXR layer 26 and a high-IXR layer 28. A membrane 24 of this type is preferably positioned in the cell so that the high-IXR layer 28 of the membrane 24 is in contact with the catalyst layer 30.

The catalyst layers 22 and 30 may be made from well-known electrically conductive, catalytically active particles or materials and may be made by methods well known in the art. The catalyst layer 22 may be formed as a film of a polymer which serves as a binder for the catalyst particles. The binder polymer can be a hydrophobic polymer, a hydrophilic polymer or a mixture of such polymers. For example, in an MEA using a perfluorinated sulfonic acid polymer membrane and a platinum catalyst, the binder polymer can also be perfluorinated sulfonic acid polymer and the catalyst can be a platinum catalyst supported on carbon particles. In the catalyst layers 22 and 30, the particles are preferably uniformly dispersed in the polymer to assure that a uniform and controlled depth of the catalyst is maintained, preferably at a high volume density with the particles being in contact with adjacent particles to form a low resistance conductive path through catalyst layer.

The catalyst layers 22 and 30 formed on the membrane should be porous so that they are readily permeable to the gases/liquids which are consumed and produced in cell. The average pore diameter is preferably in the range of 0.01 to 50 μm, most preferably 0.1 to 30 μm. The porosity is generally in a range of 10 to 99%, preferably 10 to 60%.

The catalyst layers are preferably formed using an "ink", i.e., a solution of the binder polymer and the catalyst particles, which is used to apply a coating to the membrane. The viscosity of the ink is preferably controlled in a range of 1 to $10^2$ poise especially about $10^2$ poise before printing. The viscosity can be controlled by (i) selecting particle sizes, (ii) composition of the catalytically active particles and binder, (iii) adjusting the water content (if present), or (iv) preferably by incorporating a viscosity regulating agent such as carboxymethyl cellulose, methyl cellulose, hydroxyethyl cellulose, and cellulose and polyethyleneglycol, polyvinyl alcohol, polyvinyl pyrrolidone, sodium polyacrylate and polymethyl vinyl ether.

The area of the membrane to be coated with the ink may be the entire area or only a select portion of the surface of the membrane. The catalyst ink may be deposited upon the surface of the membrane by any suitable technique including spreading it with a knife or blade, brushing, pouring, metering bars, spraying and the like. If desired, the coatings are built up to the thickness desired by repetitive application. Areas upon the surface of the membrane which require no catalyst materials, can be masked, or other means can be taken to prevent the deposition of the catalyst material upon such areas. The desired loading of catalyst upon the membrane can be predetermined, and the specific amount of catalyst material can be deposited upon the surface of the membrane so that no excess catalyst is applied. The catalyst particles are preferably deposited upon the surface of a membrane in a range from about 0.2 mg/cm$^2$ to about 20 mg/cm$^2$.

A particularly advantageous method of applying the catalyst layers to the membrane is to use a screen printing process. It is preferable to use a screen having a mesh number of 10 to 2400, especially mesh number of 50 to 1000 and a thickness in the range of 1 to 500 μm. It is preferable to select the mesh and the thickness of the screen and control the viscosity of the ink so as to give the thickness of the electrode ranging from 1 μm to 50 μm, especially 5 μm to 15 μm. The screen printing can be repeated as needed to apply the desired thickness. Two to four passes, usually three passes, has been observed to produce the optimum performance. After each application of the ink, the solvent is preferably removed by warming the electrode layer to about 50° C. to 140° C., preferably about 75° C.

A screen mask is used for forming an electrode layer having a desired size and configuration on the surface of the ion exchange membrane. The configuration is preferably a printed pattern matching the configuration of the electrode. The substances for the screen and the screen mask can be any materials having satisfactory strength such as stainless steel, poly(ethylene terephthalate) and nylon for the screen and epoxy resins for the screen mask.

After forming the catalyst coating, it is preferable to fix the ink on the surface of the membrane so that a strongly bonded structure of the electrode layer and the cation exchange membrane can be obtained. The ink may be fixed upon the surface of the membrane by any one or a combination of pressure, heat, adhesive, binder, solvent, electrostatic, and the like. The preferred embodiment for fixing the ink upon the surface of the membrane employs pressure, heat or by a combination of pressure and heat. The electrode layer is preferably pressed onto the surface of the membrane at 100° C. to 300° C., most preferably 150° C. to 280° C., under a pressure of 510 to 51,000 kPa (5 to 500 ATM), most preferably 1,015 to 10,500 kPa (10 to 100 ATM).

An alternative to printing the catalyst layer directly onto the membrane is the the so-called "decal" process. In this process, the catalyst ink is coated, painted, sprayed or screen printed onto a substrate and the solvent is removed. The resulting "decal" is then subsequently transfered from the substrate to the membrane surface and bonded, typically by the application of heat and pressure.

The anode current collector 16 and the cathode current collector 18 may be constructed as is known in the art. These structures may be the same or different. Access of oxygen, typically air to the catalyst layer is provided by employing a porous cathode current collector 18. Similarly, the anode current collector 16 is porous to permit the access of the methanol/water solution. While conductive metal screens, porous plates or other materials may also be used, a preferred material for the current collectors is conductive paper or cloth made of carbon fibers with suitable conductivity and porosity. Typically, the current collectors are bonded to the MEA by the application of heat and pressure or alternatively may held in contact with the electrodes by compressive forces in the cell.

EXAMPLES

Membranes used in the following examples were prepared generally as disclosed above, and are described in Table 1. All membrane layers were made from copolymer of TFE and $CF_2$=CF—O—$CF_2$CF($CF_3$)—O—$CF_2CF_2SO_2F$, hydrolyzed to the sulfonic acid form, the copolymers having IXR in the range of about 12:1 to about 23:1, corresponding to an EW range of about 950–1500 for the monomers used. Two of the membranes are laminates made from dissimilar components, with woven PTFE support fabric between the membrane components, while a third membrane is a laminate without support fabric. The laminates are made by bringing the components together, passing them between pressured nip rolls to remove any air from between the contacting film surfaces, and then fusing the components together under modest pressure (approximately 70 kPa) at 224°–230° C. for about 1 min. Membranes B, C, F and G are commercially available (DuPont Company).

TABLE 1

Summary of Membrane Characteristics

| Membrane | Description |
|---|---|
| A | IXR = 12.1:1, thickness = 5 mil (0.13 mm) |
| B | IXR = 14.7:1, thickness = 5 mil (0.13 mm) |
| C | IXR = 14.7:1, thickness = 7 mil (0.18 mm) |
| D | IXR = 17.1:1, thickness = 10 mil (0.25 mm) |
| E | IXR = 23.1:1, thickness = 5 mil (0.13 mm) |
| F | Laminate, 1 mil (0.025 mm) of IXR = 23.1:1 and 5 mil (0.13 mm) of IXR = 14.7:1 with PTFE fabric reinforcement |
| G | Laminate, same as Membrane F, but with different PTFE reinforcing fabric |
| H | Laminate, same as Membrane F, but with no reinforcing fabric |

EXAMPLE 1

(Pt—Ru)$O_x$ carbon paper-supported anode structures and Pt black carbon paper-supported cathode structures were integrally bonded by hot pressing to selected membranes and placed in a baseline PEMFC fixture having an active cell area of approximately 40 cm$^2$ (Type PEMFC-2, Giner, Inc.). An aqueous solution of 1M methanol was passed over the (Pt—Ru)$O_x$ electrode and $O_2$ at 30 psi was passed over the Pt cathode. The orientation of Membranes F & G was such that the 23.1:1 IXR component of the laminate was on the methanol side.

Figure 4:
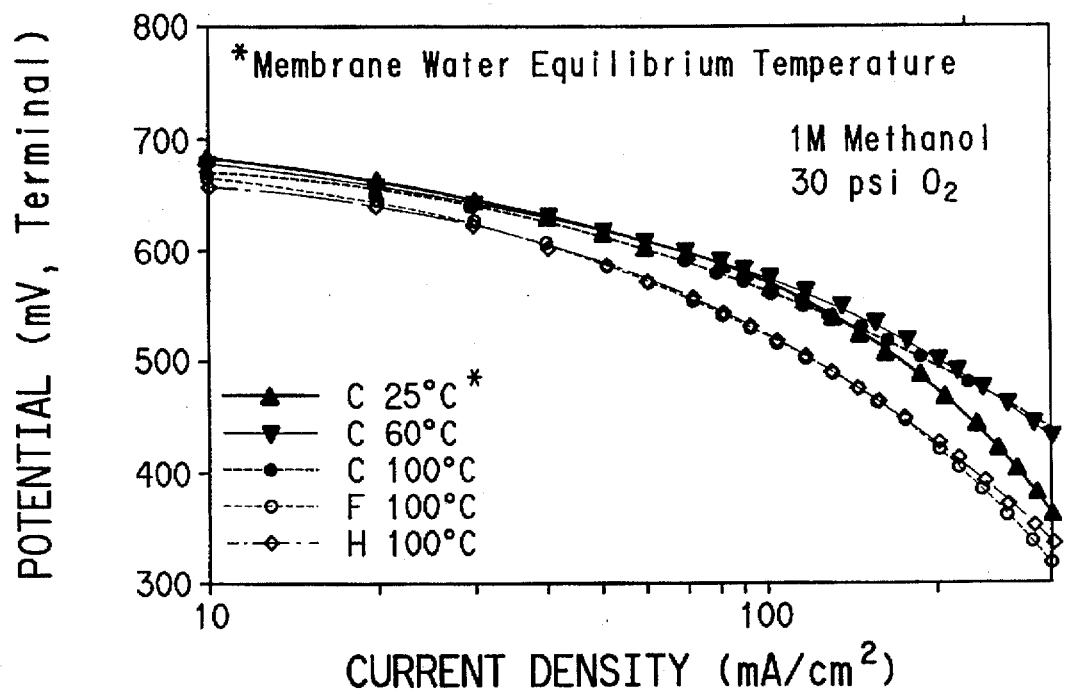
FIG. 4 shows the effect of membrane type on direct methanol PEMFC performance. See Example 1.

FIG. 4 shows the comparative performance of bonded membrane and electrode assemblies fabricated from Membranes C, F and G. At 100 mA/cm$^2$ the average voltage performance of Membranes F and G is 0.520 V and that of Membrane C is 0.560 V. A comparative measure of methanol crossover was determined by measurement of Faradaic efficiencies of the various fuel cells. In this testing the fuel cell was run at a constant current density of 100 mA/cm$^2$ on a given quantity of methanol (initially a 1M solution) until essentially 100% of the methanol was consumed, as determined by a sharp decline in cell voltage (see FIG. 2). Faradaic efficiency was determined by dividing the charge (in coulombs) produced during this test by the charge which should theoretically be produced by complete electrochemical oxidation of the given quantity of methanol, assuming the only methanol reaction to be a 6-electron direct electrochemical oxidation to $CO_2$. Values less than 100% represent inefficiency, of which a major contributor is methanol crossover.

Table 2 summarizes efficiency measurements for several membranes equilibrated at various temperatures and tested under various conditions, and shows that the Faradaic efficiencies for Membranes F and G (equilibrated in water at 100° C.) averaged 73% and that of Membrane C equilibrated under the same conditions averaged 65%. Based on these results, at 100 mA/cm$^2$, the calculated power densities are 52 mW/cm$^2$ for Membranes F/G and 56 mW/cm$^2$ for Membrane C. Use of Membranes F and G in a DMPEMFC will result in less parasitic loss of methanol (higher Faradaic efficiency) with only a slight decrease in power density.

TABLE 2

Faradaic Efficiency for Example 1

| Membrane | Equil. T (°C.) | Current Density (mA/cm$^2$) | $CH_3OH$ Conc. (M) | Eff. (%) |
|---|---|---|---|---|
| C | 25 | 100 | 1.0 | 63–66 |
| C | 60 | 100 | 1.0 | 64–69 |
| C | 100 | 100 | 1.0 | 60–69 |
| C | 100 | 200 | 1.0 | 63–70 |
| D | 100 | 100 | 1.0 | 66–72 |
| F | 100 | 100 | 1.0 | 71–74 |
| G | 100 | 100 | 0.5 | 70–76 |
| G | 100 | 100 | 1.0 | 70–76 |

EXAMPLE 2

Figure 5:
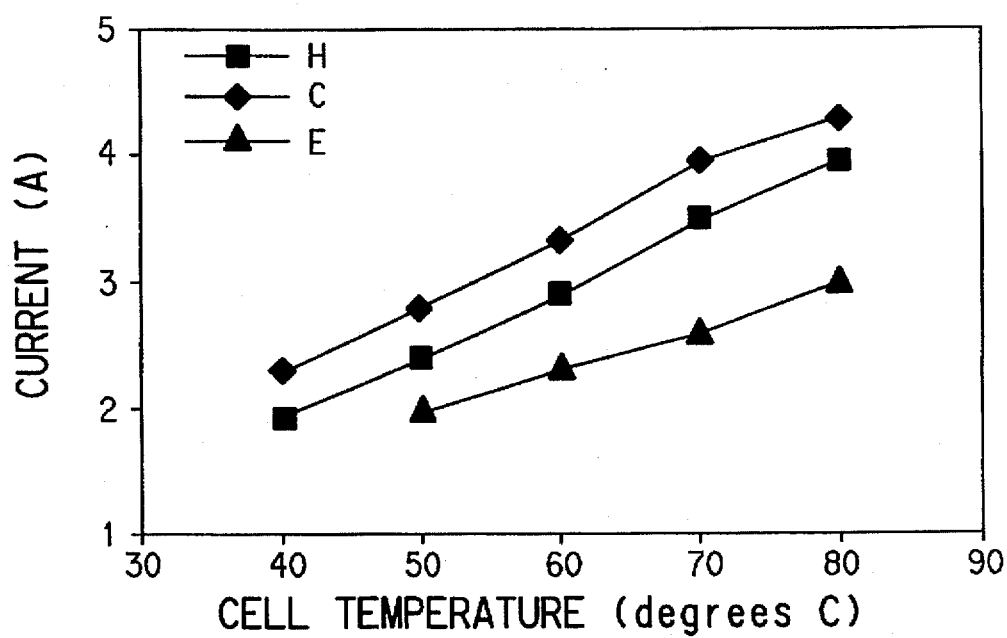
FIG. 5 shows the electrochemical oxidation at 1.0 V, vs. (Pt—Ru)$O_x$, on Pt black, of methanol permeating through selected membranes. See Example 2.

(Pt—Ru)$O_x$ carbon paper-supported anode structures and Pt black carbon paper supported cathode structures were placed in intimate contact with, but not bonded to, selected ion exchange membranes and placed in a baseline PEMFC fixture having an active cell area of approximately 40 cm$^2$ (Giner, Inc.). The orientation of Membrane H was such that the 23.1:1 IXR component of the laminate was on the methanol side. An aqueous solution of 1M methanol was passed over the (Pt—Ru)$O_x$ electrode and $N_2$ at 30 psi was passed over the Pt cathode. A potential of 1.0 V was applied between the two electrodes with the positive terminal of the constant voltage supply connected to the Pt electrode. The (Pt—Ru)$O_x$ electrode, flooded with 1M aqueous methanol, is driven to hydrogen evolution, thus the potential of the Pt electrode is +1.0 V vs. the (Pt—Ru)$O_x$ electrode. At this potential, any methanol that crosses over or permeates through the membrane from the (Pt—Ru)$O_x$ side to the Pt electrode is immediately oxidized to $CO_2$. The current observed, due to the permeability of methanol across the membrane and its electrochemical oxidation, is shown in FIG. 5 over the temperature range of 40°–80° C. for Membranes C, E and H. The relative methanol permeabilities of these membranes, and of Membrane A, measured with a 1M aqueous solution of methanol at 60° C. are shown in Table 3. Methanol permeability is expressed relative to the permeability of Membrane C. These permeabilities were estimated from measurements of the methanol oxidation current at 1.0 V, as indicated above, for a given amount of methanol as well as from crossover ($CO_2$ from permeating methanol) measurements at 100 mA/cm$^2$, at 60° C. at the $O_2$ cathode of operating direct 1M $CH_3OH/O_2$ PEM fuel cells. Results show that methanol crossover is reduced for membranes made from high-IXR fluoropolymer, and that significant reduction is obtained for laminates having a thin, high-IXR component.

TABLE 3

Relattive Methanol Permeability

| Membrane | Relative Permeability |
|---|---|
| A | 1.29 |
| C | 1.00 |
| E | 0.53 |
| H | 0.78 |

EXAMPLE 3

A laminate was made by casting (coating) a thin film of cation exchange polymer having IXR=23.1:1 onto Membrane B (IXR=14.7:1). The thickness of the high-IXR component of the laminate was 0.005 mm, or about 4% of total membrane thickness. Relative methanol permeability measured as in Example 2 was 0.75, comparable to the result obtained for Membrane H (Table 3) even though the thickness of the high-IXR component was only 20% of that in Membrane H.

EXAMPLE 4

(Pt—Ru)$O_x$ carbon paper-supported anode structures and Pt black carbon paper-supported cathode structures were integrally bonded to selected membranes and placed in a baseline PEMFC fixture having an active cell area of approximately 160 $cm^2$ (Giner, Inc.). An aqueous solution of 1M methanol was passed over the (Pt—Ru)$O_x$ electrode and $O_2$ at 30 psig (0.03 MPa) was passed over the Pt cathode. For Membrane E, the voltage observed at 60° C. was 0.48 V at 100 mA/$cm^2$. The methanol crossover or permeability was determined by analyzing the $CO_2$ formed by the parasitic reaction on the cathode of the $O_2$ feed gas and the permeating methanol. An infrared analyzer (Model GMM12, Vaisala Oz, Helsinki, Finland) was used to measure the $CO_2$ in the catholyte effluent. The analysis indicated that the methanol crossover was approximately ½ the value observed when using Membrane C operating under similar conditions. It is estimated that at 100 mA/$cm^2$, the power density for the Membrane E MEA is approximately 0.48 mW/$cm^2$ versus 0.56 mW/$cm^2$ for Membrane C.

What is claimed is:

1. A membrane and electrode assembly comprising a cation exchange membrane with an electrode formed on at least one of its surfaces, said membrane comprising polymer having a polymer backbone and cation exchange groups carried on recurring side chains attached to said polymer backbone, the ratio of carbon atoms in said polymer backbone to cation exchange groups being at least about 23:1.

2. The membrane and electrode assembly of claim 1, wherein said ratio is in the range of from 23:1 to 29:1.

3. The membrane of claim 1 wherein said cation exchange groups are selected from the group consisting of sulfonate, carboxylate, phosphonate, imide, sulfonimide and sulfonamide.

4. The membrane of claim 3 wherein said polymer is highly fluorinated polymer with sulfonate cation exchange groups.

5. The membrane of claim 4 wherein said polymer comprises a highly fluorinated carbon backbone and said side chain is represented by the formula —(OCF$_2$CFR$_f$)$_a$—OCF$_2$CFR'$_f$SO$_3$X, wherein R$_f$ and R'$_f$ are independently selected from F, Cl or a perfluorinated alkyl group having 1 to 10 carbon atoms, a=0, 1 or 2, and X is H, an alkali metal or NH$_4$.

6. The membrane of claim 4 wherein said polymer comprises a perfluorocarbon backbone and said side chain is represented by the formula —O—CF$_2$CF(CF$_3$)—O—CF$_2$CF$_2$SO$_3$X, wherein X is H, an alkali metal or NH$_4$.

7. The membrane and electrode assembly of claim 1, wherein said membrane has a thickness less than about 100 µm.

8. A membrane and electrode assembly comprising a cation exchange membrane with an electrode formed on at least one of its surfaces, said membrane being a laminate comprising a first layer of polymer having a polymer backbone and cation exchange groups carried on recurring side chains attached to said polymer backbone, the ratio of carbon atoms in said polymer backbone to cation exchange groups being at least about 23:1, and a second layer of at least one additional cation exchange polymer having a polymer backbone and cation exchange groups carried on recurring side chains attached to said polymer backbone, the ratio of carbon atoms in said polymer backbone to cation exchange groups being less than said ratio in said first layer.

9. The membrane and electrode assembly of claim 8, wherein said ratio of said polymer of said first layer is in the range of from 23:1 to 29:1.

10. The membrane and electrode assembly of claim 9, wherein said additional cation exchange polymer of said second layer has a ratio of carbon atoms in the backbone of said polymer to cation exchange groups of no more than 17:1.

11. The membrane and electrode assembly of claim 10, wherein said ratio for said additional cation exchange polymer of said second layer is in the range of from 9:1 to 17:1.

12. The membrane and electrode assembly of claim 8, wherein said first layer is no more than 50% of said laminate thickness.

13. The membrane and electrode assembly of claim 8, wherein said first layer is no more than 30% of said laminate thickness.

14. The membrane and electrode assembly of claim 8, wherein said first layer is no more than 20% of said laminate thickness.

15. A fuel cell comprising an anode compartment, a cathode compartment and a cation exchange membrane serving as a separator and electrolyte between said anode and cathode compartments, said membrane having an electrode formed on at least one of its surfaces, said membrane comprising polymer having a polymer backbone and cation exchange groups carried on recurring side chains attached to said polymer backbone, the ratio of carbon atoms in said polymer backbone to cation exchange groups being at least about 23:1.

16. The fuel cell of claim 15 operable as a direct methanol fuel cell.

* * * * *

UNITED STATES PATENT AND TRADEMARK OFFICE
CERTIFICATE OF CORRECTION

PATENT NO. : 5,672,438
DATED : September 30, 1997
INVENTOR(S) : Shoibal Banerjee, et. al.

It is certified that error appears in the above-identified patent and that said Letters Patent is hereby corrected as shown below:

Title page, item [73], Assignee: add Giner, Inc., Waltham, Massachusetts.

Signed and Sealed this

Tenth Day of March, 1998

Attest:

BRUCE LEHMAN

*Attesting Officer*   *Commissioner of Patents and Trademarks*